US008564815B2

(12) United States Patent
Nara

(10) Patent No.: US 8,564,815 B2
(45) Date of Patent: Oct. 22, 2013

(54) TRANSMISSION DEVICE, COMMUNICATION SYSTEM, IMAGE FORMING SYSTEM, COMPUTER READABLE MEDIUM AND TRANSMISSION METHOD

(75) Inventor: Shigeo Nara, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 635 days.

(21) Appl. No.: 12/850,029

(22) Filed: Aug. 4, 2010

(65) Prior Publication Data
US 2011/0183608 A1    Jul. 28, 2011

(30) Foreign Application Priority Data
Jan. 28, 2010   (JP) ................................ 2010-016769

(51) Int. Cl.
*H04N 1/00*   (2006.01)
*G06F 3/12*   (2006.01)
*G06K 15/00*  (2006.01)

(52) U.S. Cl.
USPC ................. 358/1.15; 358/405; 358/426.08; 358/1.14

(58) Field of Classification Search
USPC ............ 358/1.15, 1.14, 405, 426.08, 426.09, 358/426.1
See application file for complete search history.

(56) References Cited

U.S. PATENT DOCUMENTS

| | | | |
|---|---|---|---|
| 5,440,345 A * | 8/1995 | Shimoda .................. | 375/240.14 |
| 5,781,742 A | 7/1998 | Asano et al. | |
| 5,793,988 A | 8/1998 | Asano et al. | |
| 6,914,903 B1 * | 7/2005 | Miyazaki et al. ............. | 370/389 |
| 7,054,320 B1 * | 5/2006 | Lee et al. .................... | 370/395.6 |
| 7,861,136 B2 * | 12/2010 | Yoshida ........................ | 714/758 |
| 8,321,737 B2 * | 11/2012 | Sasaki ............................ | 714/748 |
| 2006/0088108 A1 * | 4/2006 | Ueda et al. ................ | 375/240.27 |
| 2006/0107183 A1 * | 5/2006 | Ejima et al. .................... | 714/758 |
| 2010/0158015 A1 * | 6/2010 | Wu ............................... | 370/395.7 |

FOREIGN PATENT DOCUMENTS

| | | | |
|---|---|---|---|
| JP | A-8-74312 | 3/1996 | |
| JP | 2008294757 | * 12/2008 | ................ H04L 1/00 |

* cited by examiner

Primary Examiner — Jerome Grant, II

(74) Attorney, Agent, or Firm — Oliff & Berridge, PLC

(57) ABSTRACT

A transmission device including a detection unit, a processing unit and a transmission unit. The detection unit detects whether there are plural consecutive transmission elements in which absolute values of differences between lengths of the transmission elements are equal to or less than a pre-specified value. If intermission periods are not provided in the detected transmission elements, the processing unit performs processing that inserts at least one of an irregular signal and an intermission period into at least one of the transmission elements. If intermission periods are provided in the detected transmission elements, the processing unit performs at least one of processing that changes a length of the intermission period provided in at least one of the detected transmission elements and processing that inserts an irregular signal into at least one transmission element. The transmission unit transmits the processed transmission elements in an order of a transmission element group.

8 Claims, 9 Drawing Sheets

EXAMPLE OF TLP (TRANSACTION LAYER PACKET)

TRANSMISSION DEVICE, COMMUNICATION SYSTEM, IMAGE FORMING SYSTEM, COMPUTER READABLE MEDIUM AND TRANSMISSION METHOD

CROSS-REFERENCE TO RELATED APPLICATIONS

This application is based on and claims priority under 35 USC 119 from Japanese Patent Application No. 2010-016769 filed Jan. 28, 2010.

BACKGROUND

TECHNICAL FIELD

The present invention relates to a transmission device, a communication system, an image forming system, a computer readable medium and a transmission method.

SUMMARY

According to an aspect of the invention, there is provided a transmission device including: a detection unit that detects, in a transmission element group in which a plurality of transmission elements are consecutive and in which the transmission elements contain signals that are to be transmitted and the transmission elements are provided as required with non-signal intermission periods, whether there is a plurality of consecutive transmission elements in which an absolute value of a difference in length between the transmission elements is not more than a pre-specified value; a processing unit that, if the plurality of consecutive transmission elements is detected by the detection unit and the intermission periods are not provided in the detected transmission elements, performs processing that inserts at least one of an irregular signal and an intermission period into at least one transmission element of the detected transmission elements such that the absolute value of the difference in length between the detected transmission elements is larger than the pre-specified value, and, if the plurality of consecutive transmission elements is detected by the detection unit and the intermission periods are provided in the detected transmission elements, performs at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value; and a transmission unit that transmits the transmission elements processed by the processing unit in accordance with an order of the transmission element group.

BRIEF DESCRIPTION OF THE DRAWINGS

Exemplary embodiments of the present invention will be described in detail based on the following figures, wherein.

DETAILED DESCRIPTION

Herebelow, an exemplary embodiment is described in detail with reference to the attached drawings.

Figure 1:
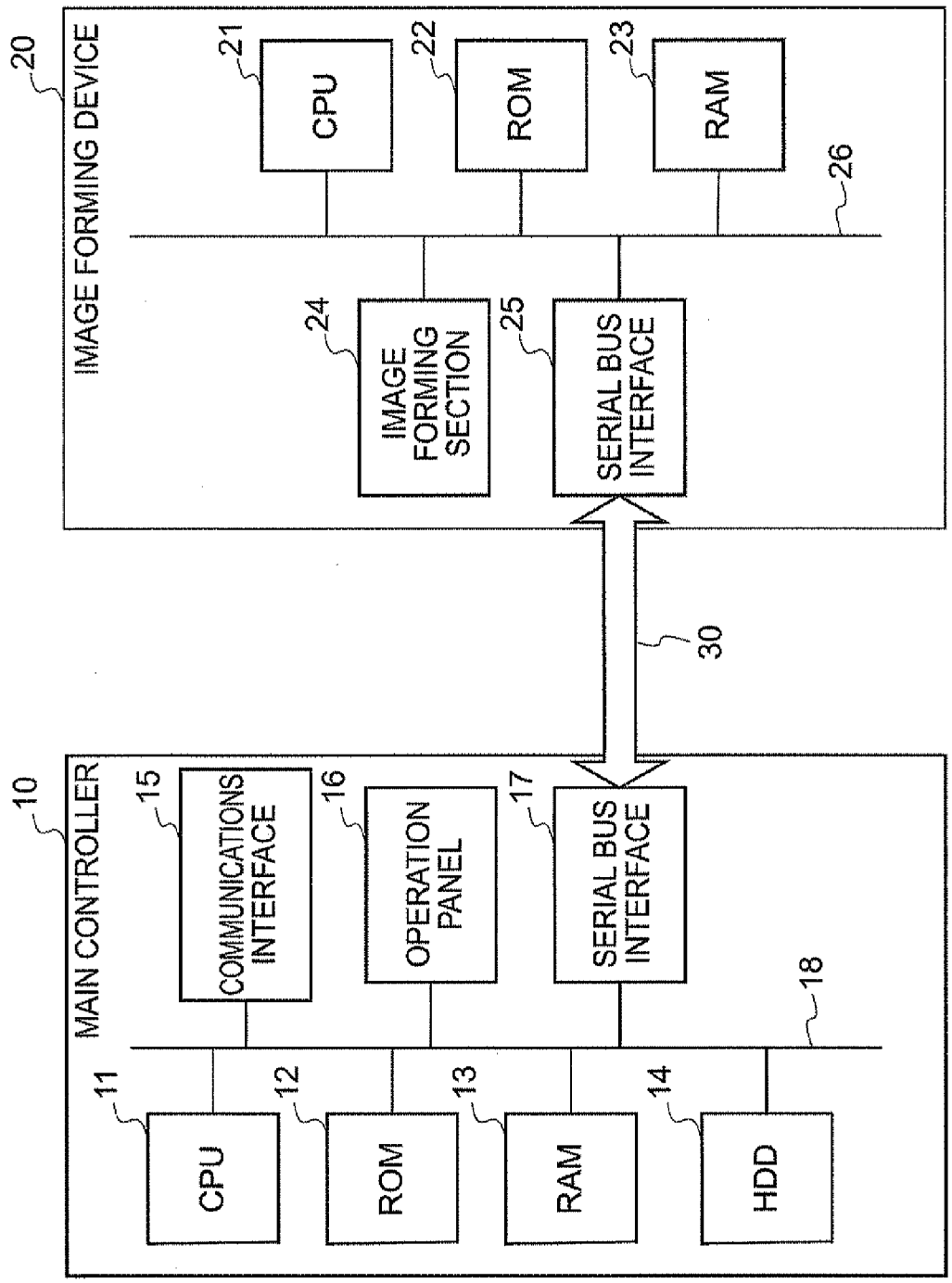
FIG. 1 is a diagram illustrating structure of an image forming system relating to an exemplary embodiment.

FIG. 1 is a diagram illustrating structure of an image forming system relating to the present exemplary embodiment.

As illustrated in FIG. 1, the image forming system relating to the present exemplary embodiment is provided with a main controller 10, serving as an example of a transmission device, and an image forming device 20, serving as an example of a reception device. The main controller 10 and the image forming device 20 are connected via a serial bus 30.

The main controller 10 conducts raster processing on printing data received from an unillustrated host computer (for example, data described in a page description language) to develop the printing data into bitmap image data, generates plural transmission elements (transmission units) (hereinafter referred to as packets) from the image data, and transmits the packets through the serial bus 30 as serial data (that is, sends the packets consecutively). The image forming device 20 extracts the image data from the packets received from the main controller 10, and forms an image on the basis of the extracted image data.

The main controller 10 is provided with a central processing unit (CPU) 11, a read-only memory (ROM) 12, a random access memory (RAM) 13, a hard disk drive (HDD) 14, a communications interface 15, an operation panel 16 and a serial bus interface 17, and these are respectively connected via a system bus 18.

Figure 3:
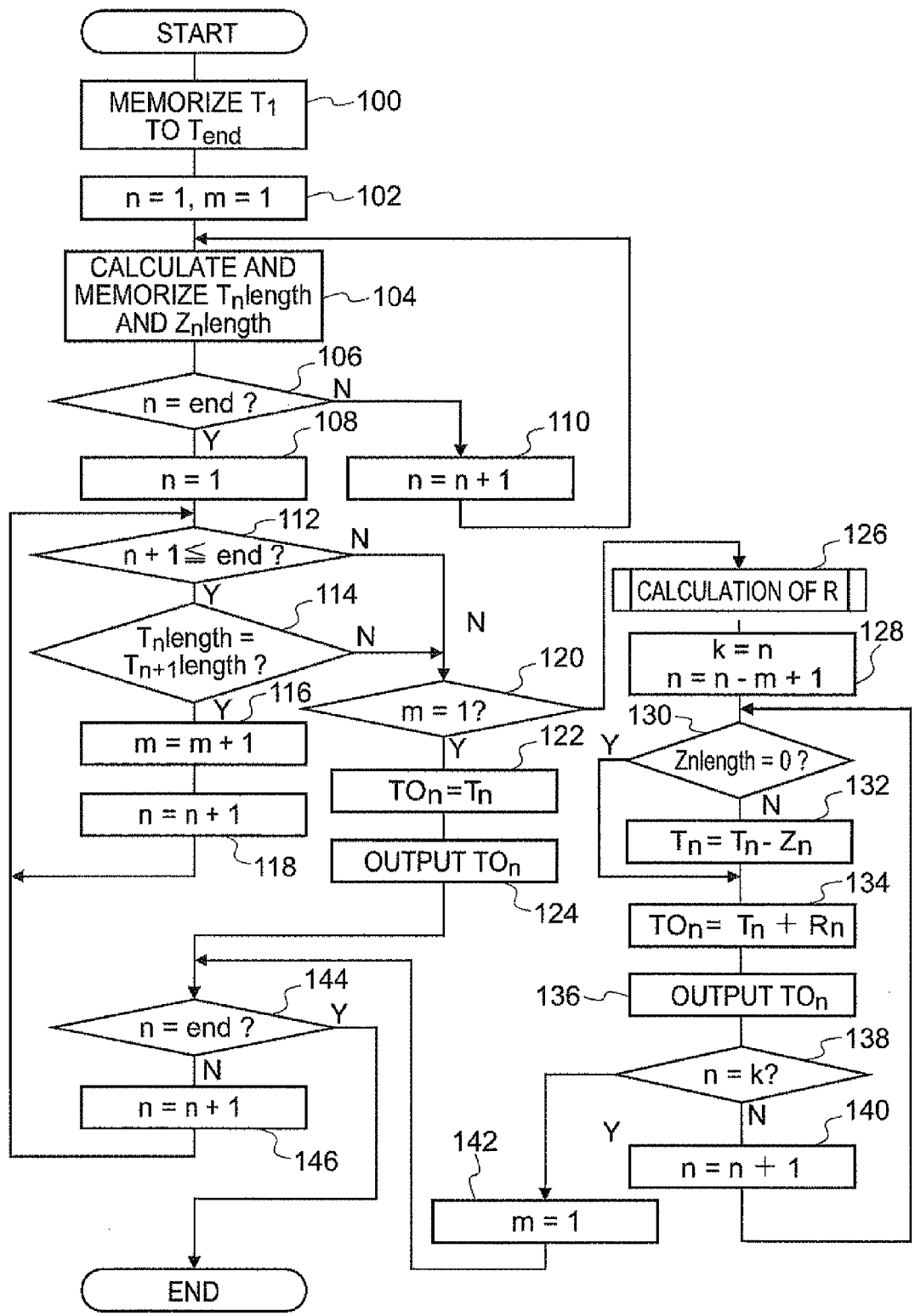
FIG. 3 is a flowchart illustrating the flow of a packet processing routine that is performed by the main controller.

The CPU 11 executes programs memorized in the ROM 12 and the HDD 14 (including a program for generating packets, a program of the packet processing routine illustrated in FIG. 3 and the like), and controls overall operations of the main controller 10. Programs to be executed by the CPU 11, data required for processing at the CPU 11 and the like are memorized in the ROM 12. The RAM 13 is used as a work memory, an image buffer that temporarily memorizes image data and the like.

Recording media for memorizing programs to be executed by the CPU 11 are not to be limited to the ROM 12 and the HDD 14. For example, flexible discs, DVDs, magneto-optical discs, CD-ROMs and the like (not illustrated) may be used, and memory devices that are other devices connected via the communications interface 15 may be used.

The communications interface 15 is connected to an unillustrated communications unit, and is an interface for communicating with an external host computer connected to the communications unit. The communications unit may be, for example, a public network, a dedicated communications network or the like, and may be a network such as the Internet, a local area network (LAN), a wide area network (WAN) or the like. The communications unit may be a wireless communications unit and may be a wired communications unit.

The operation panel 16 is structured by, for example, a touch panel display. The operation panel 16 displays various kinds of information, settings screens and the like, and inputs designations of information, instructions and the like by a user performing touch operations. The CPU 11 controls displays at the operation panel 16, detects operations of the operation panel 16, and receives information designated by the user operations and the like.

The serial bus interface 17 is connected to the serial bus 30. The main controller 10 transmits packets to the image forming device 20 via the serial bus interface 17.

The image forming device 20 is provided with a central processing unit (CPU) 21, a read-only memory (ROM) 22, a random access memory (RAM) 23, an image forming section 24 and a serial bus interface 25, and these are respectively connected via a system bus 26.

Figure 7:
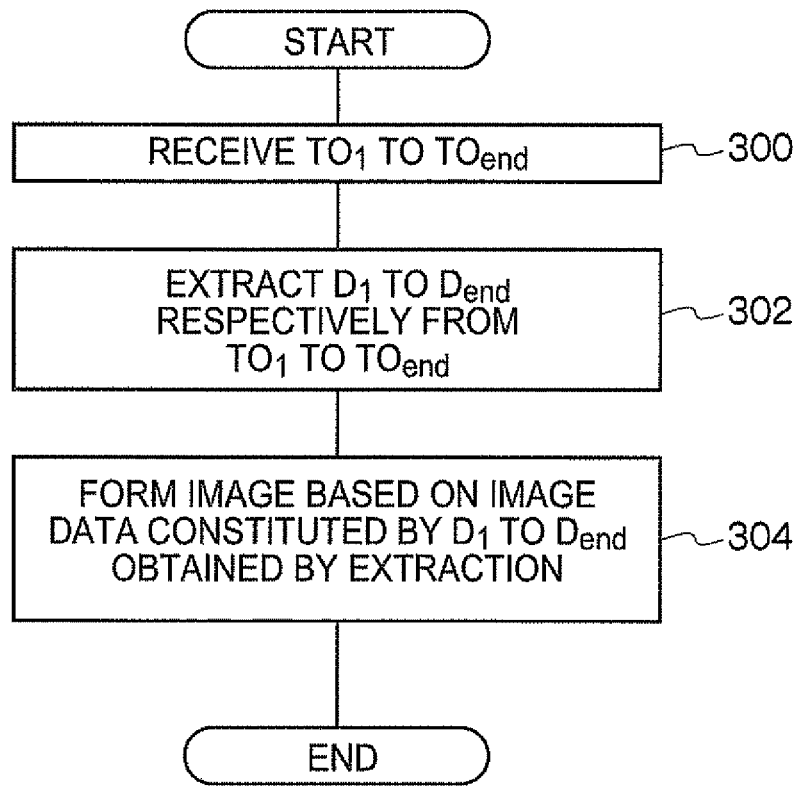
FIG. 7 is a flowchart illustrating the flow of a packet reception routine that is performed by an image forming device.

The CPU 21 executes programs memorized in the ROM 22 (including a program that extracts image data from received packets, which is illustrated in FIG. 7, and controls the image forming section 24 such that images are formed on the basis of the image data), and controls overall operations of the image forming device 20. Programs that are executed by the CPU 21, data required for processing at the CPU 21, and the like are memorized in the ROM 22. The RAM 23 is used as a work memory, an image buffer that temporarily memorizes image data, and the like.

The image forming section 24 forms an image on the basis of image data. The image forming section 24 may be an electrophotography-type image forming section that: electrostatically charges a photoreceptor; exposes the photoreceptor in accordance with image data; uses a toner to develop an electrostatic latent image produced by the exposure; transfers the developed image to a recording medium directly or via an intermediate transfer body; and fixes the transferred image using a fixing apparatus. The image forming section 24 may also be an inkjet-type image forming section that ejects ink droplets at a recording medium on the basis of image data.

The serial bus interface 25 is connected to the serial bus 30. The image forming device 20 receives packets transmitted from the main controller 10 via the serial bus interface 25.

Figure 2:
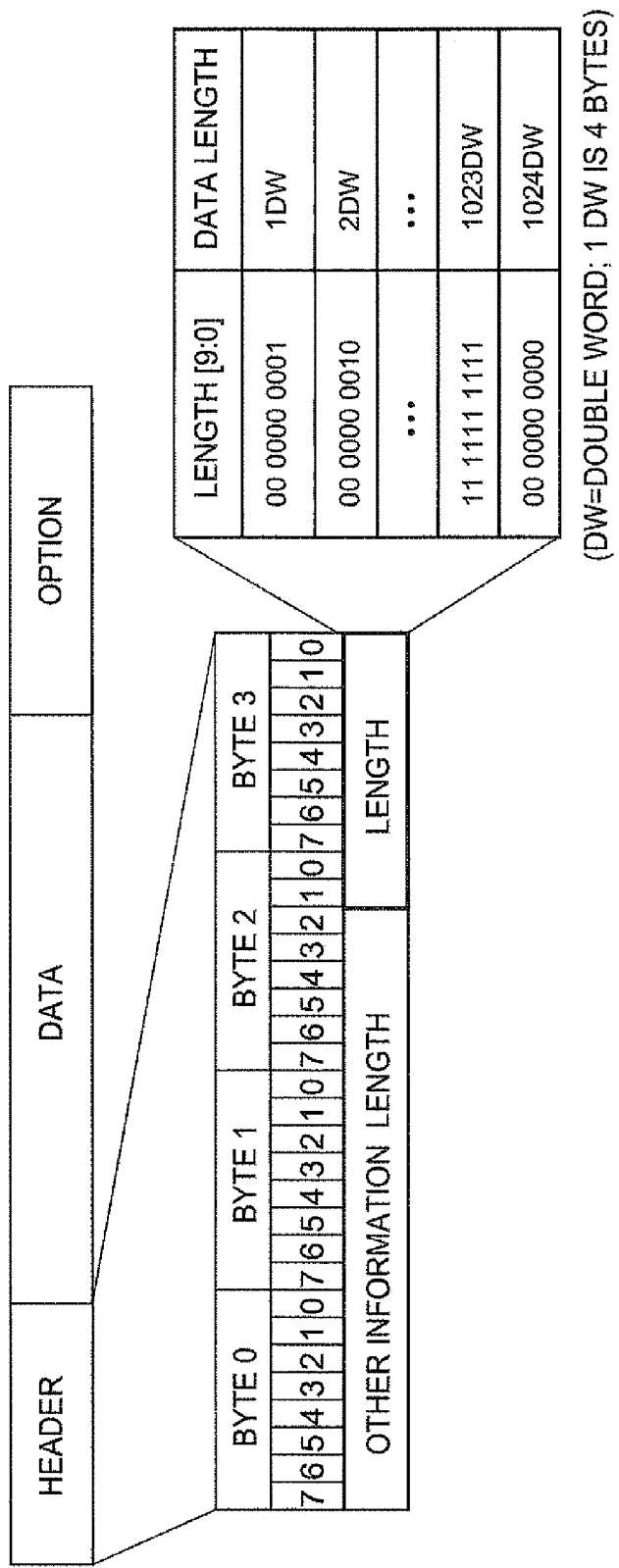
FIG. 2 is a diagram illustrating a configuration example of a packet generated by a main controller and a configuration example of a header contained in the packet.

The main controller 10 relating to the present exemplary embodiment plurally divides image data of a transmission subject (hereinafter, in order to distinguish the individual sets of image data after the division from the image data before the division, the image data after the division is simply referred to as data), adds headers to the data and generates packets. Option data for error detection, correction and the like may be added after the data as required, and intermission periods with no signal may be provided after the data/option data as required. FIG. 2 shows a configuration example of a packet generated by the main controller 10 and a configuration example of a header contained in the packet. As the example of a packet relating to the present exemplary embodiment, a transaction level packet (TLP) configuration is illustrated. The packet is configured with a header, data of the transmission subject, and option data (ECRC data for error detection and correction, and the like). As indicated above, in some cases the option data will not be included in the packet.

The header contains information representing the length of the data contained in the packet. Although not illustrated in this case, the header also contains information representing whether option data is present or absent. In the present exemplary embodiment, the configuration and length of the header are a fixed configuration and length specified beforehand.

In the present exemplary embodiment, the main controller 10 generates a plural number of packets from image data (hereinafter referred to as a packet group). Then, as a countermeasure against radiation noise, the main controller 10 generates packets in which the lengths of the respective packets of the packet group are adjusted as necessary by executing the packet processing routine illustrated in FIG. 3 (hereinafter, in order to distinguish the adjusted packets from the unadjusted packets, the adjusted packets are referred to as output packets), and transmits the generated packets to the image forming device 20.

Hereinafter, the reference symbol T is appended to each packet constituting the packet group, the reference symbol H is appended to the header contained in the packet T, the reference symbol D is appended to the data contained in the packet T, the reference symbol Z is appended to an intermission period provided in the packet T, and the reference symbol TO is appended to the output packet. In order to distinguish the respective packets, respective serial numbers 1 to end (end being the last packet) are appended thereto. For example, the third packet from the head is represented by packet $T_3$. The data contained in packet $T_3$ is referred to as data $D_3$ and the intermission period provided in packet $T_3$ is referred to as intermission period $Z_3$. The output packet TO corresponding to packet $T_3$ is represented by output packet $TO_3$. In the following descriptions, option data is not contained in any of the packets included in the packet group.

In step 100, the generated packet group (packets $T_1$ to $T_{end}$) is memorized in a first memory area of the RAM 13.

In step 102, n is set to 1 and m is set to 1.

In step 104, the memorized packet group is read in sequence, the length of packet $T_n$ (packet length: $T_n$length), and the length of the intermission period $Z_n$ included in packet $T_n$ (intermission period length: $Z_n$length) are calculated and memorized in a second memory region of the RAM 13. As each $T_n$length, a length from the start of the header $H_n$ contained in the packet $T_n$ to the start of the header $H_{n+1}$ contained in the next packet $T_{n+1}$ is calculated. For $Z_n$length, first the length of the data $D_n$ ($D_n$length) is extracted from the header $H_n$, and $T_n$length-($H_n$length+$D_n$length) is calculated to find $Z_n$length.

In step 106, it is determined whether or not the value of n is end. If it is determined that n is not end, then n is incremented by 1 in step 110, control passes to step 104, and $T_n$length and $Z_n$length of the next packet $T_n$ are calculated and memorized. When n is end, the packet lengths and intermission period lengths have been calculated and memorized for each of the packets $T_1$ to $T_{end}$. Therefore, in step 108, n is set to 1 and control passes to step 112.

In step 112, it is determined whether or not n+1 is less than or equal to end. If it is determined that n+1 is less than or equal to end, then in step 114 the aforementioned memorized information of the lengths T is read out. $T_n$length and $T_{n+1}$ length are compared, and it is determined whether or not the difference therebetween is zero (i.e., whether or not $T_n$length=$T_{n+1}$length). If it is determined that $T_n$length=$T_{n+1}$ length, control passes to step 116 and m is incremented by 1. That is, m represents a number of successive packets T with the same Tlength. In step 118, n is incremented by 1 and control returns to step 112. That is, by the sequence of processing from step 112 to step 116, it is detected whether or not there are consecutive packets T with equal lengths T.

On the other hand, if it is determined in step 112 that n+1 is greater than end or if it is determined in step 114 that $T_n$length does not equal $T_{n+1}$length, then control passes to step 120.

In step 120, it is determined whether or not m is 1. If it is determined that m is 1, control passes to step 122. On the other hand, if it is determined in step 120 that m is not 1, then control passes to step 126.

In step 122, the n-th packet $T_n$ is set as is to be the output packet $TO_n$. In step 124, the output packet $TO_n$ is outputted to a region of the RAM 13 that is reserved as a transmission buffer. In step 144, it is judged whether or not n is end. If n is not end, then n is incremented by 1 in step 146 and control returns to step 112.

Alternatively, in step 126, when it is detected in step 120 that m is not 1, for each of the plural consecutive packets $T_{n-m-1}$ to $T_n$ between which the difference in Tlength is zero (hereinafter, these are referred to as the detected packet group), a subroutine is executed that calculates adjustment data R to be used for generating output packets TO whose lengths T are adjusted so as to be different from one another. In this case, the adjustment data R is random signals unrelated to the data D contained in the packets T.

Figure 4:
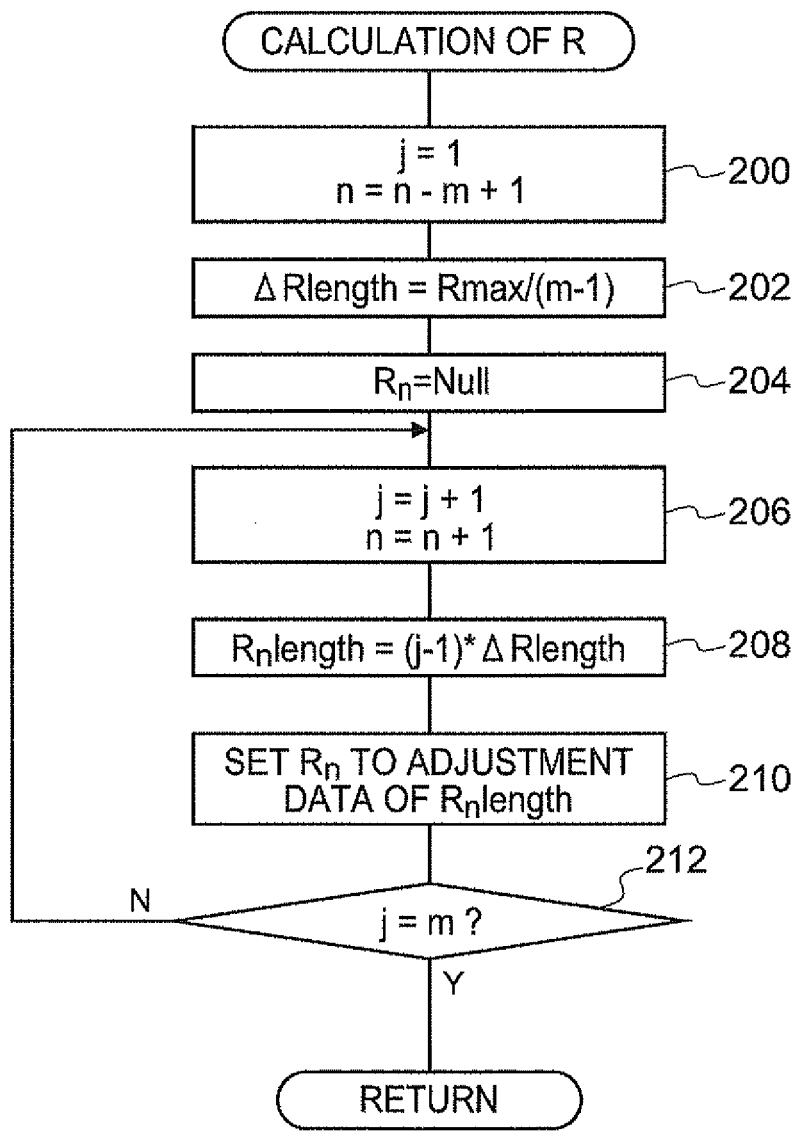
FIG. 4 is a flowchart illustrating the flow of a subroutine that calculates R.

FIG. 4 is a flowchart illustrating the flow of the subroutine that calculates R.

In step 200, j is set to 1 and n is set to n−m+1. Here, j is a counter for counting the packets T in the detected packet group, and n−m+1 is the serial number corresponding to the leading packet in the detected packet group.

In step 202, a length Rmax is divided by (m−1) to find ΔRlength. Rmax represents a maximum length permitted as a length of the adjustment data R, and is a value specified beforehand. In the present exemplary embodiment, Rmax is specified in advance such that the lengths of the output packets TO will not be lengths greater than or equal to a pre-specified length.

In step 204, the adjustment data $R_n$ for packet $T_n$ (in this case, the leading packet of the detected packet group) is set to Null.

In step 206, j is incremented by 1 and n is incremented by 1.

In step 208, (j−1)*ΔRlength is calculated to find the length of the n-th adjustment data $R_n$ ($R_n$length).

In step 210, $R_n$ is set to adjustment data of length $R_n$length.

In step 212, it is determined whether or not j equals m. If it is determined that j does not equal m, control returns to step 206. When it is determined in step 212 that j equals m, the present subroutine ends and control passes to step 128 of FIG. 3.

In step 128, k is set to n and n is set to n−m+1.

In step 130, information on $Z_n$length is read out, and it is determined whether or not $Z_n$length is zero. If it is determined that $Z_n$length is not zero, then in step 132 the intermission period $Z_n$ is removed from the packet $T_n$. If it is determined in step 130 that $Z_n$length is zero, then step 132 is skipped and control passes to step 134.

In step 134, a packet with the n-th adjustment data $R_n$ inserted into the n-th packet $T_n$ (in this case, added after the data $D_n$) is set as the output packet $TO_n$. In step 136, the output packet $TO_n$ is outputted to the region of the RAM 13 that is reserved as the transmission buffer.

In step 138, it is judged whether or not n equals k. If it is determined that n does not equal k, then n is incremented by 1 in step 140 and control returns to step 130. If it is determined in step 138 that n equals k, generation of the output packets TO for all of the packets T in the detected packet group has ended. Accordingly, in step 142, m is initialized (m is set to 1) and control passes to step 144. The processing of steps 144 and 146 is as described above so will not be described here.

According to the processing described above, if it is detected, for example, that the lengths T of each of packet $T_1$, packet $T_2$ and packet $T_3$ are the same, then if $Z_1$length, $Z_2$length and $Z_3$length are not zero (i.e., intermission periods Z are provided in all the packets), the following output packets are generated.

$TO_1 = T_1 - Z_1 + R_1$ ($R_1$=Null)
$TO_2 = T_2 - Z_2 + R_2$ ($R_2$=adjustment data of ΔRlength)
$TO_3 = T_3 - Z_3 + R_3$ ($R_3$=adjustment data of 2*ΔRlength)

Figure 5:
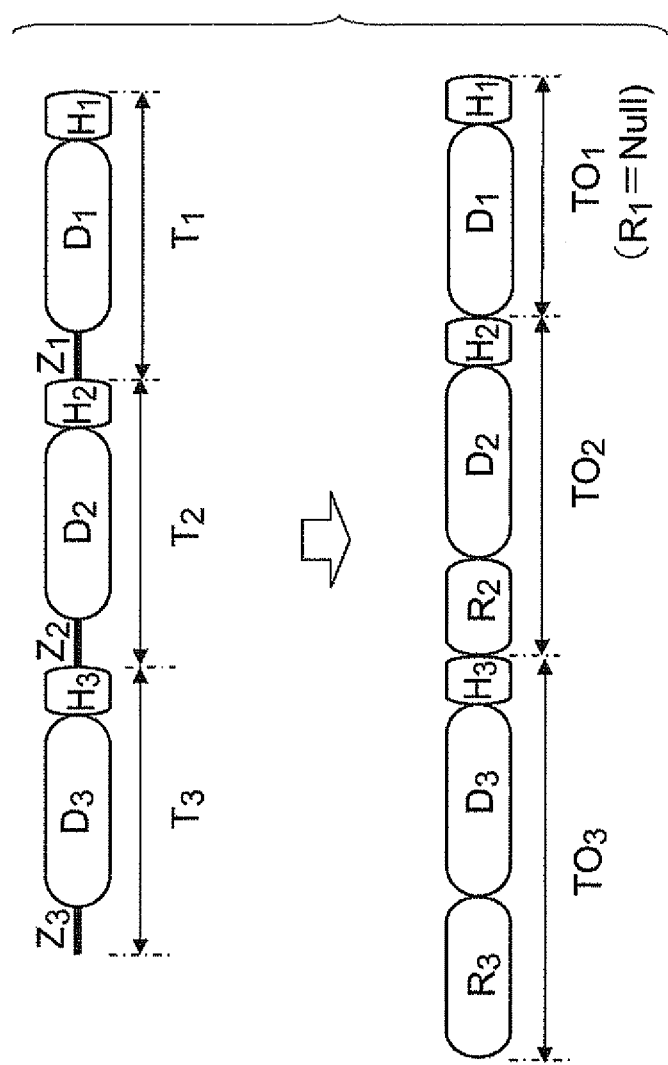
FIG. 5 is a diagram illustrating an example of output packets generated by the packet processing routine.

For the first packet $T_1$, an output packet $TO_1$ is generated with the intermission period $Z_1$ originally provided in the packet $T_1$ removed. For the second packet $T_2$, an output packet $TO_2$ is generated with the intermission period $Z_2$ originally provided in the packet $T_2$ removed and adjustment data $R_2$ whose length is ΔRlength inserted after the data $D_2$. For the third packet $T_3$, an output packet $TO_3$ is generated with the intermission period $Z_3$ originally provided in the packet $T_3$ removed and adjustment data $R_3$ whose length is twice ΔRlength inserted after the data $D_3$ (see FIG. 5).

According to the processing described above, if it is detected, for example, that the lengths T of each of packet $T_1$, packet $T_2$ and packet $T_3$ are the same, then if $Z_1$length, $Z_2$length and $Z_3$length are zero (i.e., intermission periods Z are not provided in any of the packets), the following output packets are generated.

$TO_1 = T_1 + R_1$ ($R_1$=Null)
$TO_2 = T_2 + R_2$ ($R_2$=adjustment data of ΔRlength)
$TO_3 = T_3 + R_3$ ($R_3$=adjustment data of 2*ΔRlength)

For the first packet $T_1$, an output packet $TO_1$ is generated from the packet $T_1$ as is. For the second packet $T_2$, an output packet $TO_2$ is generated with adjustment data $R_2$ whose length is ΔRlength inserted after the data $D_2$. For the third packet $T_3$, an output packet $TO_3$ is generated with adjustment data $R_3$ whose length is twice ΔRlength inserted after the data $D_3$.

Because the packet lengths are adjusted as described above, high-frequency radiation noise whose fundamental wave has a frequency of $1/T_1$length is suppressed.

When the output packets $TO_1$ to $TO_{end}$ are generated and outputted and stored to the transmission buffer in the order $TO_1$ to $TO_{end}$ as described above, the main controller 10 serially transmits the generated output packets through the serial bus 30 to the image forming device 20 in the order of storage.

Figure 6:
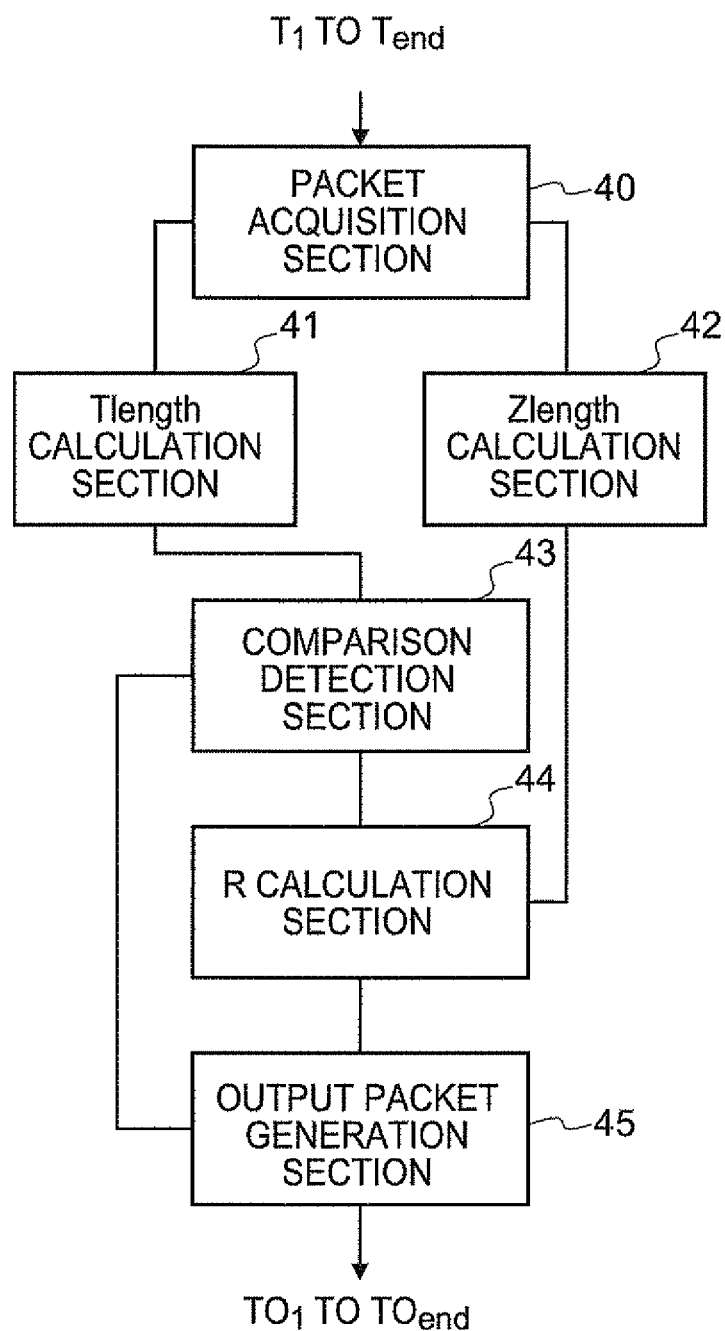
FIG. 6 is a block diagram representing functional structure of the main controller relating to the exemplary embodiment.

FIG. 6 shows a block diagram representing functional structure (after generation of the packets T) of the main controller 10 relating to the exemplary embodiment described above.

A packet acquisition section 40 acquires the packet group generated from the image data (packets $T_1$ to $T_{end}$), and memorizes the packet group in the first memory area of the RAM 13. The functioning of the packet acquisition section 40 corresponds to the above-described step 100.

A Tlength calculation section 41 calculates the packet length (Tlength) of each of the packets $T_1$ to $T_{end}$. A Zlength calculation section 42 calculates the intermission period length (Zlength) of each of the packets $T_1$ to $T_{end}$ acquired by the packet acquisition section 40. The results of these calculations are memorized in the second memory area of the RAM 13. The functioning of the Tlength calculation section 41 and the Zlength calculation section 42 correspond to the above-described steps 102 to 110.

A comparison detection section 43 compares the values of Tlength of pairs of consecutive packets T and detects detected packet groups. The functioning of the comparison detection section 43 corresponds to the above-described steps 112 to 118.

An R calculation section 44 calculates R. The functioning of the R calculation section 44 corresponds to the above-described step 126.

An output packet generation section 45 generates the output packets TO on the basis of results from the comparison detection section 43 (values of m in the exemplary embodiment described above). The functioning of the output packet generation section 45 corresponds to the above-described steps 122 and 124 and steps 128 to 140.

Operation of the image forming device 20 is described using FIG. 7.

In step 300, the output packets $TO_1$ to $TO_{end}$ transmitted from the main controller 10 are received at the image forming device 20 by the serial bus interface 25.

In step 302, the respective headers $H_1$ to $H_{end}$ of the received output packets $TO_1$ to $TO_{end}$ are extracted, the data $D_1$ to $D_{end}$ is extracted in accordance with the headers $H_1$ to $H_{end}$ (the adjustment data R that has been added after the data is ignored), and the original image data is rendered (re-created) from the data $D_1$ to $D_{end}$. Alternatively, the adjustment data $R_n$ may be found by an algorithm the reverse of the above-described packet processing routine of the main controller 10, the adjustment data $R_n$ removed, the respective headers $H_1$ to $H_{end}$ of the output packets $TO_1$ to $TO_{end}$ extracted, the data $D_1$ to $D_{end}$ extracted in accordance with the headers $H_1$ to $H_{end}$, and the image data rendered. This latter case may be carried out by carrying out processing to include values of m in the respective headers $H_1$ to $H_{end}$ of $TO_1$ to $TO_{end}$, or the like in the packet processing routine at the main controller 10.

In step 304, the image forming section 24 is controlled so as to form an image on the basis of the image data.

In the exemplary embodiment described above, an example is described in which the packet processing routine is carried out by the CPU 11 of the main controller 10 executing a program. However, this is not to be limiting. For example, the functions illustrated in FIG. 6 may be realized by hardware.

Figure 8:
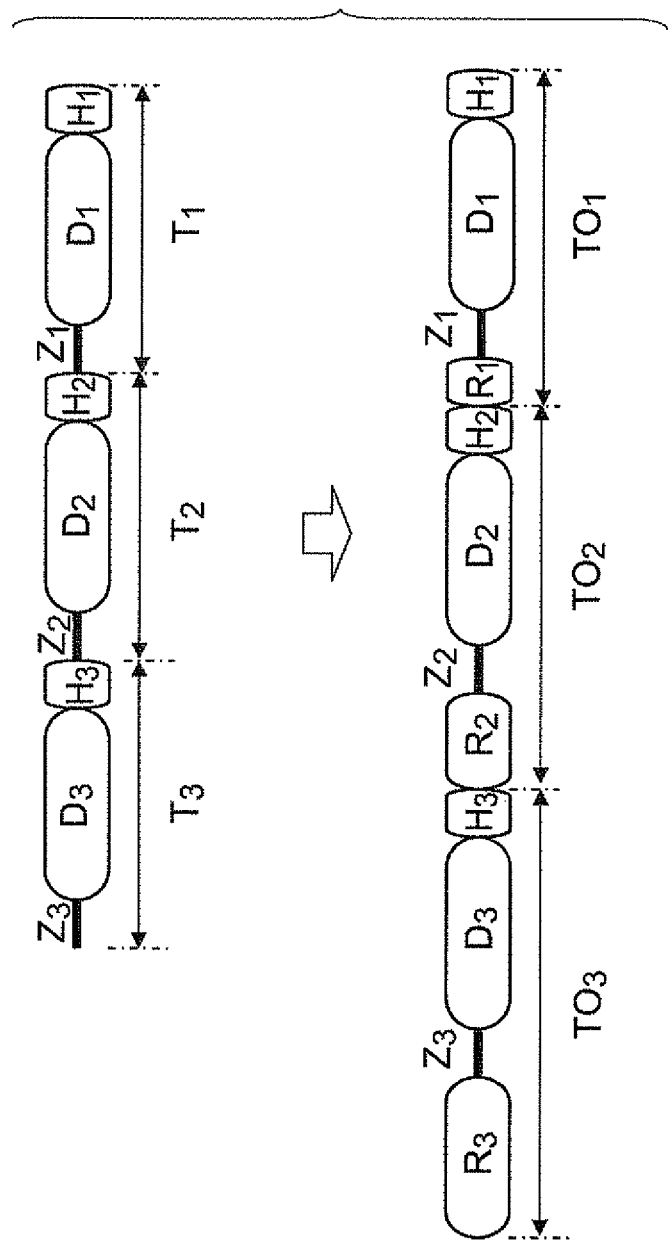
FIG. 8 is a diagram illustrating an example of output packets generated by another packet processing routine.

In the exemplary embodiment described above, an example is described in which, for each of the packets in the detected packet group, if Zlength is not zero, the intermission period Z is removed from the packet T and the adjustment data R is inserted. However, this is not to be limiting. For example, originally provided intermission periods Z may be left as is and the adjustment data R inserted after the intermission periods Z (see FIG. 8). The adjustment data R may also be inserted after the data D and before the intermission periods Z.

In the exemplary embodiment described above, an example is described in which the adjustment data is Null for the leading packet T of the detected packet group and the adjustment data R that is inserted from the subsequent packet T is, in order, ΔRlength, 2*ΔRlength, 3*ΔRlength, etc. However, this is not to be limiting. For example, the adjustment data R that is inserted may be, in order from the leading packet T of the detected packet group, ΔRlength, 2*ΔRlength, 3*ΔRlength, etc. In this case, in step 202 Rmax is divided by m to find ΔRlength.

In the exemplary embodiment described above, a case in which the adjustment data R is random signals and the random signals are inserted into the packets T to generate the output packets TO, of which plural packets with the same length are not consecutive, is presented as an example and described. However, this is not to be limiting. For example, instead of random signals, intermission periods with the calculated lengths Rlength may be provided to generate the output packets TO of which plural packets of the same length are not consecutive.

Adjustments such as shortening lengths of the intermission periods Z that are originally provided in the packets T or the like may be performed to generate the output packets TO of which plural packets of the same length are not consecutive. Both random signals and intermission periods may be added and inserted to generate the output packets TO of which plural packets of the same length are not consecutive.

Figure 9:
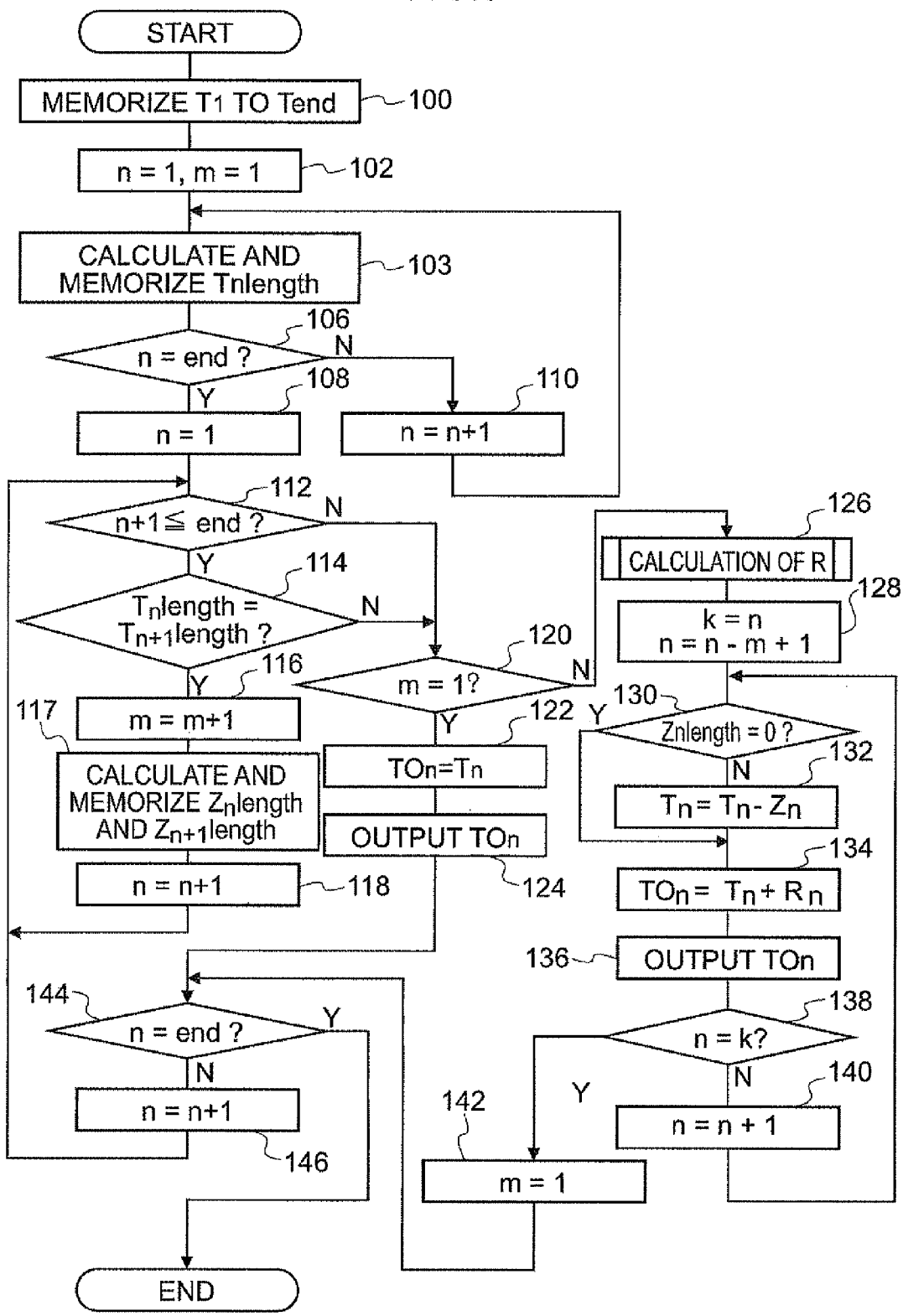
FIG. 9 is a flowchart illustrating a variant example of the packet processing routine.

In the exemplary embodiment described above, an example is described in which, in step 104, all the values of Tlength and Zlength of the packets T of the packet group are calculated and memorized first. However, this is not to be limiting. For example, the values of Tlength may be calculated first, and a respective value of Zlength calculated when the result of comparing the values of Tlength of a pair of consecutive packets is that the lengths are the same. FIG. 9 shows a flowchart for when processing is performed in this manner. In FIG. 9, steps that perform the same processing as in FIG. 3 are assigned the same reference numerals.

After step 102, in step 103, $T_n$length is calculated and memorized. The method of calculation of $T_n$length is as described above. $Z_n$lengthis not calculated in step 103.

A calculation of Zlength is performed after it has been determined in step 114 that $T_n$length equals $T_{n+1}$length. In step 117 of FIG. 9, which is after step 116 and before step 118, $Z_n$length and $Z_{n+1}$length are calculated and memorized. However, any of steps 116, 117 and 118 may be performed after step 114, and the sequence thereof is not to be particularly limited.

If it is determined that $T_n$length equals $T_{n+1}$length in step 114 and then, after the processing of steps 116 to 118 is performed, it is again determined in step 114 that $T_n$length equals $T_{n+1}$length, the $Z_n$length at this time has already been calculated and memorized as the $Z_{n+1}$length of the previous processing of step 117. Therefore, calculation and memorization of $Z_n$length is omitted and only calculation and memorization of $Z_{n+1}$length is performed.

In the exemplary embodiment described above, a case is described in which option data is not included in any of the packets T of the packet group. However, if option data is included, then, for example, in step 104 of the flowchart of FIG. 3 of the exemplary embodiment described above, whether option data is present or absent may be verified from the header H of each packet T. When there is option data, the length of the option data may be subtracted from Tlength to find Zlength. The same applies to FIG. 9 too.

In the exemplary embodiment described above, m is used as a parameter representing the number of consecutive packets between whom the difference in Tlength is zero. An upper limit may be provided for m. As an example, the upper limit value is 10, and if m reaches 10 and the next packet T continues with the same length, control is forcibly passed to step 126 and the output packet TO is generated. Rather than providing an upper limit for m, Rmax may be varied in accordance with m.

Rmax may differ in accordance with the lengths T of the packets of the detected packet group. For example, Rmax may be set to a value that is Tlength divided by a pre-specified number (for example, 10).

In the exemplary embodiment described above, an example is described in which the adjustment data R is added in the sequence ΔRlength, 2*ΔRlength, 3*ΔRlength, etc. (i.e., the lengths of the adjustment data R change regularly so as to sequentially get longer from the head of the detected packet group). However, this is not to be limiting. For example, the lengths of the adjustment data R may change irregularly. For example, in a subroutine for calculating R, an irregular sequence of the order m−1 may be found and the sequence of R rearranged into this regular sequence and added to the packets T. Thus, the lengths of the consecutive output packets TO may change irregularly after the leading packet.

In the exemplary embodiment described above, it is described that the headers H have a fixed configuration and length specified beforehand. However, this is not to be limiting. For example, if Hlength is variable in accordance with Dlength, then when plural packets T with the same value of Tlength are consecutive, similarly to the above descriptions, output packets TO may be generated in which the respective lengths are made different by the adjustment data R. This is because even if, for example, plural consecutive packets T have different values of Hlength, radiation noise increases if values of Tlength and Zlength are the same.

In the exemplary embodiment described above, an example is described in which no footers are contained in the packets T. With packets T that contain footers too, processing similar to that described above may be performed, treating the footers as part of the data.

In the exemplary embodiment described above, an example is described in which it is detected whether or not plural packets T with the same value of Tlength are consecutive, and processing is performed to make the lengths of the detected packets different from one another and transmit the same. However, this is not to be limiting. For example, even if values of Tlength are not exactly the same, radiation noise is produced if differences therebetween are small. Therefore, the determination in step 114 may be affirmative if an absolute value of the difference between values of Tlength is less than or equal to a pre-specified threshold value. This threshold value is calculated and specified beforehand in accordance with magnitudes of radiation noise according to prior testing or the like. In this case, ΔRlength should be set to a length larger than the threshold value.

In the exemplary embodiment described above, a case in which image data is packetized and serially transmitted from the main controller 10 to the image forming device 20 is presented as an example and described. However, the above exemplary embodiment is not to be limiting. There may be a transmission device that contains some other data instead of image data in packets that are to be transmitted as signals, adjusts the packet lengths as described above and serially transmits the same, and there may be a communication system that includes a reception device that receives the packets serially transmitted from the transmission device and extracts the data contained in these packets.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. A transmission device comprising:
a detection unit that detects, in a transmission element group in which a plurality of transmission elements are consecutive and in which the transmission elements contain signals that are to be transmitted and the transmission elements are provided as required with non-signal intermission periods, whether there is a plurality of consecutive transmission elements in which an absolute value of a difference in length between the transmission elements is not more than a pre-specified value;
a processing unit that,
if the plurality of consecutive transmission elements is detected by the detection unit and the intermission periods are not provided in the detected transmission elements, performs processing that inserts at least one of an irregular signal and an intermission period into at least one transmission element of the detected transmission elements such that the absolute value of the difference in length between the detected transmission elements is larger than the pre-specified value, and,
if the plurality of consecutive transmission elements is detected by the detection unit and the intermission periods are provided in the detected transmission elements, performs at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value; and
a transmission unit that transmits the transmission elements processed by the processing unit in accordance with an order of the transmission element group.

2. The transmission device according to claim 1, wherein, when the processing unit performs processing such that the absolute value of the difference in length between the detected transmission elements is larger than the pre-specified value, the processing unit performs the processing such that lengths of the detected transmission elements change irregularly.

3. The transmission device according to claim 1, wherein, when the processing unit performs processing such that the absolute value of the difference in length between the detected transmission elements is larger than the pre-specified value, the processing unit performs the processing such that lengths of the detected transmission elements do not become greater than or equal to a pre-specified length.

4. The transmission device according to claim, 1 wherein, when the processing unit performs processing such that the absolute value of the difference in length between the detected transmission elements is larger than the pre-specified value, the processing unit performs the processing such that lengths of the detected transmission elements change irregularly and do not become greater than or equal to a pre-specified length.

5. A communication system comprising:
(A) a transmission device comprising:
a detection unit that detects, in a transmission element group in which a plurality of transmission elements are consecutive and in which the transmission elements contain signals that are to be transmitted and the transmission elements are provided as required with non-signal intermission periods, whether there is a plurality of consecutive transmission elements in which an absolute value of a difference in length between the transmission elements is not more than a pre-specified value,
a processing unit that,
if the plurality of consecutive transmission elements is detected by the detection unit and the intermission periods are not provided in the detected transmission elements, performs processing that inserts at least one of an irregular signal and an intermission period into at least one transmission element of the detected transmission elements such that the absolute value of the difference in length between the detected transmission elements is larger than the pre-specified value, and, if the plurality of consecutive transmission elements is detected by the detection unit and the intermission periods are provided in the detected transmission elements, performs at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value, and a transmission unit that transmits the transmission elements processed by the processing unit in accordance with an order of the transmission element group; and (B) a reception device comprising:

a reception unit that receives the transmission elements transmitted from the transmission device in a transmission order, and an extraction unit that extracts the signals to be transmitted from each of the transmission elements received by the reception unit.

6. An image forming system comprising:

(A) an image data transmission device comprising:

a detection unit that detects, in a transmission element group in which a plurality of transmission elements are consecutive and in which the transmission elements contain image data and the transmission elements are provided as required with non-signal intermission periods, whether there is a plurality of consecutive transmission elements in which an absolute value of a difference in length between the transmission elements is not more than a pre-specified value, a processing unit that, if the plurality of consecutive transmission elements is detected by the detection unit and the intermission periods are not provided in the detected transmission elements, performs processing that inserts at least one of an irregular signal and an intermission period into at least one transmission element of the detected transmission elements such that the absolute value of the difference in length between the detected transmission elements is larger than the pre-specified value, and, if the plurality of consecutive transmission elements is detected by the detection unit and the intermission periods are provided in the detected transmission elements, performs at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value, and a transmission unit that transmits the transmission elements processed by the processing unit in accordance with an order of the transmission element group; and (B) an image forming device comprising:

a reception unit that receives the transmission elements transmitted from the transmission device in a transmission order, an extraction unit that extracts the image data from each of the transmission elements received by the reception unit, and an image forming unit that forms an image on the basis of the image data extracted by the extraction unit.

7. A non-transitory computer readable medium storing a program causing a computer to execute a process for transmitting signals, the process comprising:

detecting, in a transmission element group in which a plurality of transmission elements are consecutive and in which the transmission elements contain signals that are to be transmitted and the transmission elements are provided as required with non-signal intermission periods, whether there is a plurality of consecutive transmission elements in which an absolute value of a difference in length between the transmission elements is not more than a pre-specified value;

if the plurality of consecutive transmission elements is detected and the intermission periods are not provided in the detected transmission elements, performing processing that inserts at least one of an irregular signal and an intermission period into at least one transmission element of the detected transmission elements such that the absolute value of the difference in length between the detected transmission elements is larger than the pre-specified value;

if the plurality of consecutive transmission elements is detected by the detection unit and the intermission periods are provided in the detected transmission elements, performing at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value; and transmitting the processed transmission elements in accordance with an order of the transmission element group.

8. A transmission method comprising:

detecting, in a transmission element group in which a plurality of transmission elements are consecutive and in which the transmission elements contain signals that are to be transmitted and the transmission elements are provided as required with non-signal intermission periods, whether there is a plurality of consecutive transmission elements in which an absolute value of a difference in length between the transmission elements is not more than a pre-specified value;

if the plurality of consecutive transmission elements is detected and the intermission periods are not provided in the detected transmission elements, performing processing that inserts at least one of an irregular signal and an intermission period into at least one transmission element of the detected transmission elements such that the absolute value of the difference in length between the detected transmission elements is larger than the pre-specified value;

if the plurality of consecutive transmission elements is detected by the detection unit and the intermission periods are provided in the detected transmission elements, performing at least one of processing that changes a length of the intermission period provided in at least one transmission element of the detected transmission elements and processing that inserts an irregular signal into at least one transmission element of the detected transmission elements such that the absolute value of the difference in length between the detected transmission elements is larger than the pre-specified value; and
transmitting the processed transmission elements in accordance with an order of the transmission element group.

* * * * *